United States Patent
Majima

(10) Patent No.: US 8,335,972 B2
(45) Date of Patent: Dec. 18, 2012

(54) SOFT DECISION DEVICE AND SOFT DECISION METHOD

(75) Inventor: Taichi Majima, Yokohama (JP)

(73) Assignee: Kabushiki Kaisha Kenwood, Kachiouji-shi, Tokyo (JP)

( * ) Notice: Subject to any disclaimer, the term of this patent is extended or adjusted under 35 U.S.C. 154(b) by 533 days.

(21) Appl. No.: 12/600,718

(22) PCT Filed: May 20, 2008

(86) PCT No.: PCT/JP2008/059231
§ 371 (c)(1),
(2), (4) Date: Nov. 18, 2009

(87) PCT Pub. No.: WO2008/143251
PCT Pub. Date: Nov. 27, 2008

(65) Prior Publication Data
US 2010/0162086 A1    Jun. 24, 2010

(30) Foreign Application Priority Data

May 21, 2007 (JP) ................................ 2007-134655

(51) Int. Cl.
*H03M 13/00* (2006.01)
(52) U.S. Cl. ...................... 714/780; 714/786
(58) Field of Classification Search .................. 714/780, 714/786
See application file for complete search history.

(56) References Cited

U.S. PATENT DOCUMENTS

| | | | |
|---|---|---|---|
| 6,000,054 A * | 12/1999 | Bahr et al. | 714/786 |
| 7,043,680 B2 * | 5/2006 | Aizawa | 714/776 |
| 7,317,761 B2 * | 1/2008 | Lozhkin | 375/260 |
| 2001/0008022 A1 * | 7/2001 | Kokuryo et al. | 714/786 |

FOREIGN PATENT DOCUMENTS

JP       2004-032125       1/2004

OTHER PUBLICATIONS

International Search Report for PCT/JP2008/059231 dated Aug. 5, 2008.
International Preliminary Report on Patentability dated Jan. 21, 2010 (Application No. PCT/JP2008/059231).

* cited by examiner

*Primary Examiner* — Charles Ehne
(74) *Attorney, Agent, or Firm* — Eric J. Robinson; Robinson Intellectual Property Law Office, P.C.

(57) ABSTRACT

A soft decision device and method for obtaining a soft decision value as a value expressing a probability as near the actual probability as possible by simple processing. The soft decision device and method are used to output a soft decision value for each bit of each symbol used for decoding the each symbol as a value corresponding to the function value obtained by applying a predetermined function for each bit to the sampled value of the each symbol according to the demodulated signal such that the probability distribution of the sampled value in each symbol point is the Gauss distribution. The function for each bit is approximated to a curve expressing the probability that each bit is 1 or 0 for the sampled value of each symbol of the demodulated signal and defined by using a quadratic function.

4 Claims, 5 Drawing Sheets

SOFT DECISION DEVICE AND SOFT DECISION METHOD

TECHNICAL FIELD

The present invention relates to a soft decision device for outputting a soft decision value for each bit of each symbol used for decoding each symbol based on a demodulated signal and to a soft decision method.

BACKGROUND ART

In mobile communication, a coding gain is often improved to increase a reception performance on a poor transmission path such that a demodulation circuit is devised and error correction is performed based on a soft decision value. A code outputted as a soft decision value is sent to an error corrector as data which indicates an accuracy of 0 to 7 and in which 1-bit data outputted as 0 or 1 in a hard decision is extended to 3 bits for example. The accuracy can be obtained by quantizing a demodulated continuous wave by an appropriately determined threshold value.

FIG. 7 illustrates a relationship between a probability distribution and a soft decision value as to a binary in the case of a binary code. The abscissa in the graph of the figure denotes an amplitude of a demodulated wave and the ordinate denotes probability. Reference numeral 71 in the figure denotes a curve expressing a probability distribution in the case where a demodulated wave is 1 and reference numeral 72 denotes a curve expressing a probability distribution in the case where the demodulated wave is 0. Numerals 0 to 7 are soft decision values allotted to the amplitude of each amplitude range. In general, the soft decision for a binary code by BPSK or the like is performed by outputting the soft decision value allotted to the amplitude of the demodulated wave as illustrated in FIG. 7. A soft decision value 0 for a code 0 is most probable and a soft decision value 7 for the code 0 is most improbable. A soft decision value 7 for a code 1 is most probable and a soft decision value 0 for the code 1 is most improbable.

FIG. 8 illustrates an example of soft decision for the case of a four-level code. For multilevel coding such as four-level coding, for example, an operation similar to one in FIG. 7 is performed on a complex plane. That is to say, as illustrated in FIG. 8, the soft decision, similar to that in FIG. 7, of a received signal is performed both at a real part and at an imaginary part and the soft decision values may be outputted at the respective parts. Such a technique is used in Patent Document 1 for example. Furthermore, such a technique is discussed in a conventional example of Patent Document 2.

FIG. 9 illustrates an amplitude in the case where a demodulated wave is viewed by a time waveform and the correspondence of the amplitude to the soft decision value allotted to the amplitude. Thus, the four-level is allotted to an amplitude value of a linear time waveform to enable the soft decision value to be obtained based on the amplitude value of the time waveform. This is applied to the case in FIG. 8, which is equivalent to the arrangement of the threshold value of each soft decision value at an equal angle.

Incidentally, herein, a rate in which the amplitude of a demodulated wave is allotted to each soft decision value is referred to as "weighting." The allotment of each soft decision value to each range in which the amplitude of a demodulated wave is divided by an equal threshold value, as in the aforementioned example, is referred to as "linear weighting." FIGS. 8 and 9 are different in the allotment of weighting from each other. In each case, a certain criterion is equally allotted, so that each case is treated as linear weighting.

Error correction in a soft decision decoding method has been often used in a Viterbi decoder, for example. The Viterbi decoder processes a soft decision value as a metric, adds the metric for each bit and completes a trellis. Since the metric is a distance between codes, it is desirable that the metric is the probability for the code word.

However, according to a conventional linear weighting concerning a soft decision value, a threshold value is arranged at equally spaced intervals as illustrated in FIGS. 7 and 8, so that the soft decision value does not fully represent an actual probability. For example, the graph of FIG. 7 illustrates a probability distribution in which a demodulation bit is 0 or 1 with respect to the amplitude of a demodulated wave on the abscissa under the condition of a certain error rate. If this is rewritten to the probability that a demodulation bit is 1, FIG. 10 is obtained. In other words, if the soft decision value is 0 to 2, the decoded word is substantially 1. If the soft decision value is 5 to 7, the decoded word is substantially not 1. The probability is reversed between the soft decision values of 3 and 4, which shows that the soft decision value cannot represent the probability.

In order to solve the above problem, the soft decision unit in Patent Document 2 is equipped with an S/N detecting unit in its receiver to vary the threshold value of the soft decision according to reception environment, avoiding the above problem. According to the above method, however, a circuit such as the S/N detecting unit needs adding. Furthermore, a plurality of threshold values for soft decision need preparing to perform a complicated process.

FIG. 11 illustrates the measured values of the probability that the demodulation bit of four-level FSK is 1 at a certain error rate with the abscissa as amplitude and the ordinate as probability. Bit arrangement corresponding to the amplitude is described later. According to the conventional soft decision method, for the four-level FSK, the soft decision value is not changed if the amplitude is −3 or less and 3 or more. Actually, however, the probability is decreased due to the intensity of Gauss noise or multipath fading. According to the conventional soft decision method, it is also difficult to reproduce this portion.

According to a decoding apparatus and decoding method in Patent Document 3, the dispersion of actual quantization noise and Gauss noise is determined by calculation to perform the soft decision decode for the purpose of improving the accuracy of turbo decoding. Thus determining the dispersion of Gauss noise allows calculating the probability of a code word from a demodulated wave and also accurately representing decrease in the probability if the amplitude value is large, which however causes a problem that significantly complicates the calculation.

Patent Document 1: Japanese Patent Application Laid-Open No. H10-136046
Patent Document 2: Japanese Patent Application Laid-Open No. H06-29951
Patent Document 3: Japanese Patent Application Laid-Open No. 2005-286624

DISCLOSURE OF THE INVENTION

Problems to be Solved by the Invention

In view of the problems of the aforementioned conventional technique, a first object of the present invention is to enable the soft decision value to be calculated as an approximate value representing the probability as near the actual probability as possible so that weighting is optimized in allotting a soft decision value to a demodulated wave. A second object of the present invention is to make the calculation of the approximate value extremely simple on the assumption that the calculation is performed by software using a DSP or the like.

Means for Solving the Problems

To achieve the above object of the present invention, a soft decision device according to a first aspect of the present invention is characterized by outputting a soft decision value for each bit of each symbol used for decoding each symbol in correspondence with the function value obtained by applying a predetermined function for each bit to the sample value of each symbol based on the demodulated signal in which the probability distribution of the sample value at each symbol point represents the Gauss distribution due to noise of a communication path, wherein each predetermined function for each bit is approximated to a curve expressing the probability that each bit is 1 or 0 with respect to the sample value of each symbol of the demodulated signal and formed by using a quadratic function.

A demodulated signal for the case of a four-level FSK modulation or a QPSK modulation, for example, corresponds to the demodulated signal in which a potential sample value represents the Gauss distribution due to noise of a communication path. A curve obtained by actual measurement or by calculation using probability density functions of Gauss distribution, for example, correspond to a curve expressing the probability that each bit is 1 or 0 with respect to the sample value of each symbol of the demodulated signal.

In this configuration, a function for each bit for obtaining the soft decision value of each bit of each symbol is approximated to a curve expressing the probability that each bit is 1 or 0 with respect to the sample value of each symbol in the demodulated signal, so that the function value obtained by applying each function for each bit to the sample value of each symbol is better approximated to the probability that each bit is 1 or 0. For this reason, the corresponding soft decision value also better represents the probability.

The function for each bit is formed by using a quadratic function and does not use an exponential function (exp), so that the function value for the sample value can be obtained only by repeating calculations of square, absolute value, addition, and subtraction several times. In other words, the calculation can be described in dozen-line steps by C language, for example. For this reason, this enables calculating and outputting the soft decision value for each bit for each sample value without the need for a large load for a processing apparatus.

In the first aspect of the present invention, a soft decision device according to a second aspect thereof is characterized in that, if the predetermined function is taken as $y=f(x)$, $f(x)$ can be obtained by: (1) squaring y of a curve which is expressed by a straight line the slope of which is 1 or −1 in the range of x of a portion formed by the quadratic function and in which y is a constant value in the range of x of other portions; (2) parallel displacing the entire curve to the direction y by a predetermined value and then reversing the value y in the predetermined range of x; and (3) performing scaling so that the value y of the reversed curve corresponds to the soft decision value.

In the second aspect of the present invention, a soft decision device according to a third aspect thereof is characterized in that, if each bit of the symbol is a first and a second bit in the case of a multi-value number of 2 on the assumption that the demodulated signal is based on a multi-value modulation system and if the symbol points are taken as $-3*a/2, -a/2, a/2, 3*a/2$ in a bipolar expression with "a" as a predetermined constant, the first bit of the function for each bit can be obtained by: performing the aforementioned process (1) by squaring $ABS(n-ABS(x))+a-n$ being a function of "x" with a function value as "a" in a range of "x" where the function value is L or more and a function value as 0 in a range of "x" where the function value is 0 or less, where "x" is the amplitude of a demodulated wave, "n" and "L" are predetermined constants, and ABS is an absolute value; performing the aforementioned process (2) by subtracting the square of "a" from the function obtained by the process in the range where "x" is 0 or more and subtracting the function from the square of "a" in the range where "x" is 0 or less; and performing the aforementioned process (3); on the other hand, the second bit of the function can be obtained by: performing the aforementioned process (1) by squaring $ABS(ABS(-ABS(x))+a)-a$ being a function of "x" with a function value as "a" in a range of "x" where the function value is L or more; performing the aforementioned process (2) by subtracting the function obtained by the process from the square of "a" in the range where the absolute value of "x" is "a" or more and subtracting the square of "a" from the function in the range where the absolute value of "x" is "a" or less; and performing the aforementioned process (3). Incidentally, the values of the first and the second bit correspond to the case where gray codes used as the symbol value are "11" (−3), "10" (−1), "00" (+1), and "01" (+3).

In the soft decision device according to any one of the first to third aspect of the present invention, a soft decision device according to a fourth aspect thereof is characterized in that, if the predetermined function is taken as f(x), the value of f(x) in the predetermined range at both ends of the range where "x" varies is a half of the range where f(x) varies.

A soft decision method according to a fifth aspect of the present invention is characterized by performing a process to output a soft decision value for each bit of each symbol used for decoding each symbol in correspondence with the function value obtained by applying a predetermined function for each bit to the sample value of each symbol based on the demodulated signal in which the probability distribution of the sample value at each symbol point represents the Gauss distribution due to noise of a communication path, wherein each predetermined function for each bit is approximated to a curve expressing the probability that each bit is 1 or 0 with respect to the sample value of each symbol of the demodulated signal and formed by using a quadratic function.

Effects of the Invention

According to the present invention, a function for each bit for obtaining the soft decision value of each bit of each symbol is approximated to a curve expressing the probability that each bit is 1 or 0 with respect to the sample value of each symbol in the demodulated signal, so that the soft decision value for the sample value of each symbol can be outputted as the soft decision value better representing the probability that each bit is 1 or 0.

The function for each bit is formed by using a quadratic function without using an exponential function (exp) to enable calculating and outputting the soft decision value for each bit for each sample value without the need for a large load for a processing apparatus.

BRIEF DESCRIPTION OF THE DRAWINGS

FIG. 10 is a graph in which FIG. 7 is rewritten for the case of the probability that a demodulation bit is 1.

DESCRIPTION OF SYMBOLS

1: RF circuit, 2: Detecting phase circuit, 3: Symbol acquirement unit, 4: Clock regeneration unit, 5: Soft decision decoding unit, and 71 & 72: Curve expressing probability distribution

BEST MODES FOR CARRYING OUT THE INVENTION

Figure 1:
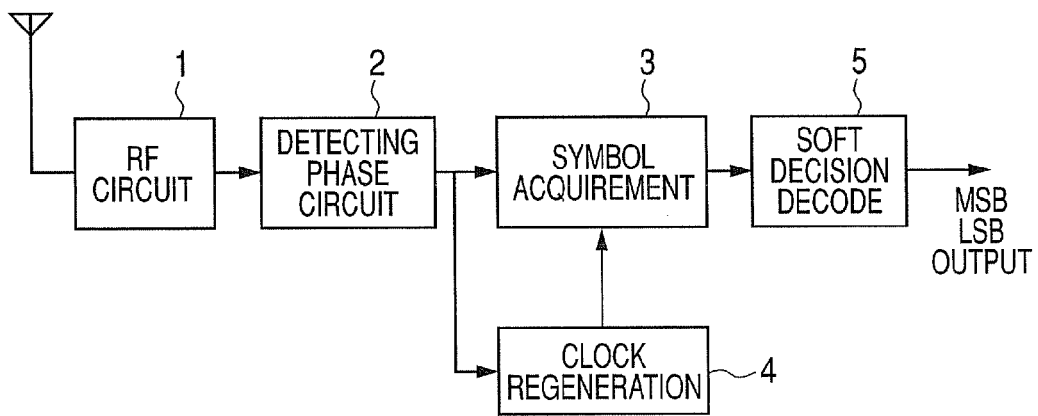
FIG. 1 is a block diagram illustrating the configuration of a radio equipment according to an embodiment of the present invention.

FIG. 1 is a block diagram illustrating the configuration of a radio equipment according to an embodiment of the present invention. In the radio equipment, as illustrated in the same figure, a signal inputted through an antenna is converted to an intermediate frequency signal through tuning, heterodyne conversion or the like in an RF circuit 1. A demodulated wave is reproduced in a detecting phase circuit 2 based on the signal. The demodulated wave is sampled at an appropriate sampling interval by a symbol acquirement unit 3 based on a sampling clock from a clock regeneration unit 4, converted to MSB and LSB soft decision values by a soft decision decoding unit 5 and outputted.

Figure 2:
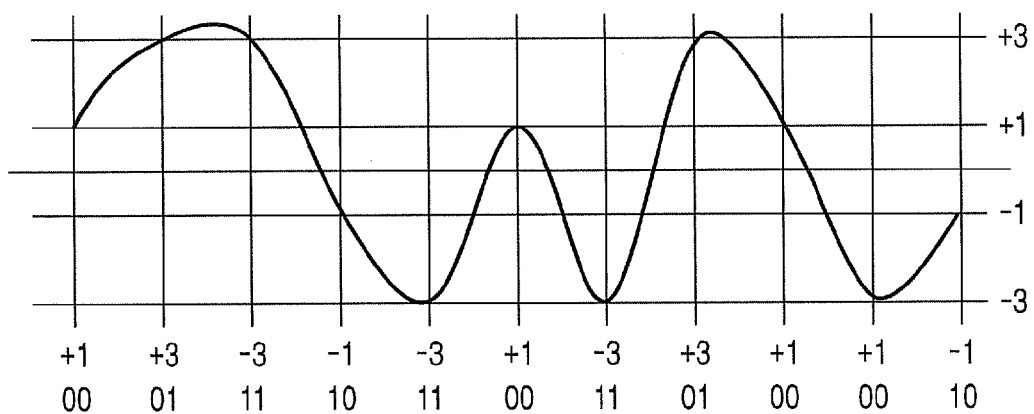
FIG. 2 is a graph illustrating a demodulated wave outputted by a detecting phase circuit of the radio equipment in FIG. 1.

FIG. 2 illustrates a demodulated wave outputted by the detecting phase circuit 2. The abscissa indicates time. The demodulated wave is sampled at an appropriate sampling interval by the symbol acquirement unit 3 to provide an amplitude value as a reception symbol. The amplitude value is normalized by −3 to +3. For the hard decision, a gray code is used to determine each amplitude to be "−3," "−1," "+1," and "+3," thereby providing 2-bit decoded words "11," "10," "00," and "01" per one symbol. The first half of the decoded words is referred to as "MSB bit" and the second half of the decoded words is referred to as "LSB bit."

Figure 9:
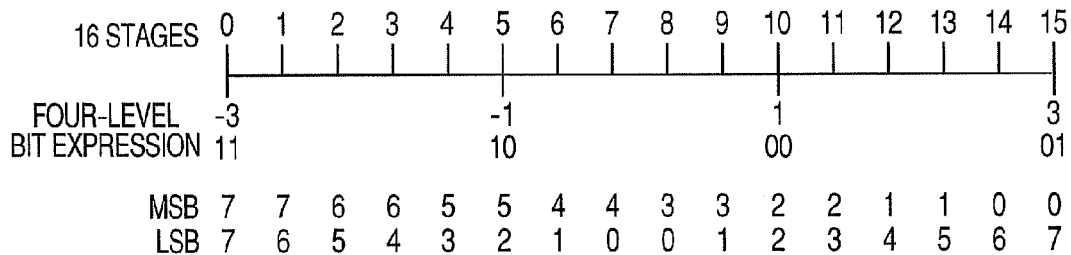
FIG. 9 is a diagram illustrating an amplitude in the case where a demodulated wave is viewed by a time waveform and the correspondence of the amplitude to soft decision values allotted to the amplitude according to a conventional example.
Figure 10:
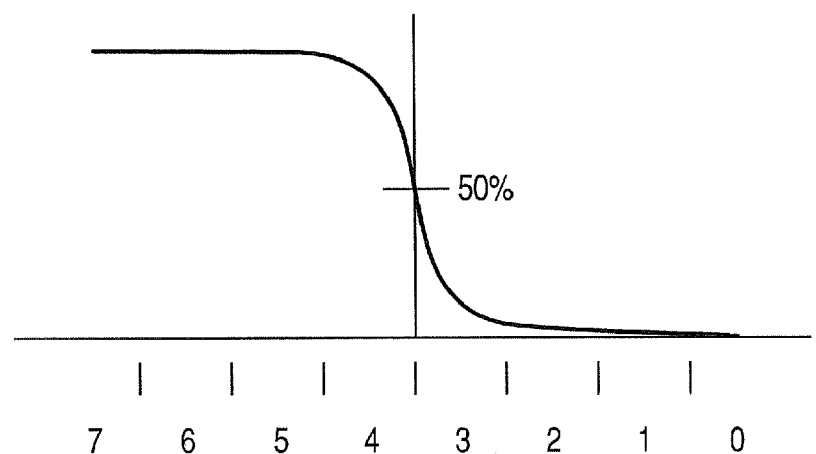

For the soft decision, the accuracies of the MSB and the LSB bit per one symbol need to be determined. If the soft decision is performed by the linear weighting, the obtained amplitude value is applied to the correspondence of the amplitude value to the soft decision value in FIG. 9 to allow determining the soft decision value as to the MSB and the LSB bit. However, as described above, it is hardly possible to reproduce the curve of the actual probability as to the MSB and the LSB bit. Even though the curve is linearly approximated, it is difficult to obtain the soft decision value correctly representing probability based on the amplitude value. In the present embodiment, therefore, the curve expressing the probability is approximated by a quadratic function. In order to reduce a load for processing an approximate calculation, a quadratic curve is formed by deforming a simple quadratic curve $y=x^2$.

FIGS. 3 and 4 illustrate procedures for determining a curve expressing the soft decision values of the MSB and the LSB bit in an approximate fashion. In other words, the curve to be obtained is a curve approximated to the curve in FIG. 11. In the procedure, the amplitude of a demodulated wave is taken as "x," a variable for adjusting a curve shape is taken as "n," and a value for determining the range of approximation is taken as "L." FIGS. 3 and 4 illustrate the procedures for the cases of n=2.8 and L=2.8.

Figure 3A:
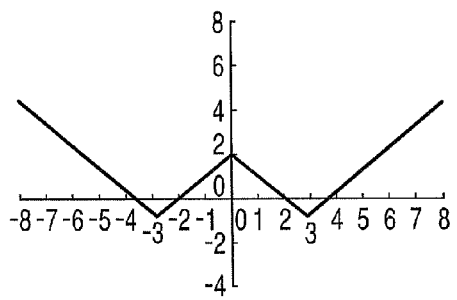
FIG. 3 is a graph illustrating procedures for obtaining in an approximate manner a curve expressing the soft decision value of MSB bit.
Figure 3C:
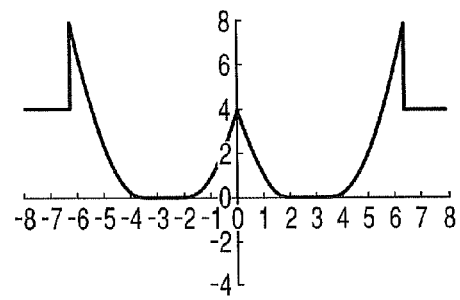
Figure 3B:
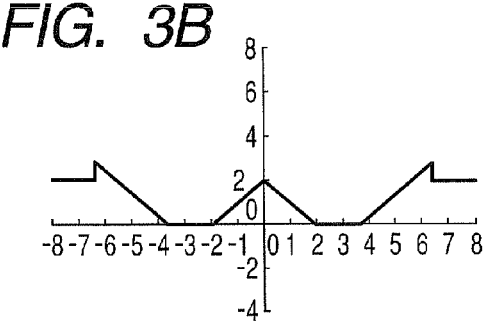
Figure 3D:
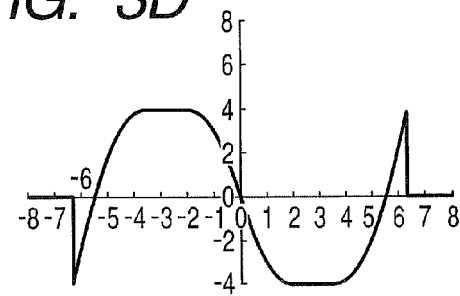

In order to obtain a curve expressing the soft decision value as to the MSB bit, a curve of y=ABS(n−ABS(x))+2−n is first obtained as illustrated in FIG. 3(a). Then, the value of y as to the curve is fixed to 2 when y is L or more, and the value of y is taken as 0 when y is 0 or less, thereby the curve of FIG. 3(b) is obtained. The value of y as to the curve of FIG. 3(b) is squared to obtain the curve of FIG. 3(c). As to the curve of FIG. 3(c), 4 is subtracted from y and taken as new y when x is 0 or more, and y is subtracted from 4 and taken as a new y when x is 0 or less, thereby the curve of FIG. 3(d) is obtained. The curve of FIG. 3(d) is scaled so that the values of y become 0 to 7. This can approximate the curve expressing the soft decision value of the MSB to the curve in FIG. 11.

Figure 4A:
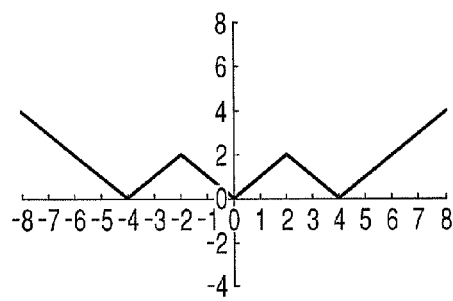
FIG. 4 is a graph illustrating procedures for obtaining in an approximate manner a curve expressing the soft decision value of LSB bit.
Figure 4C:
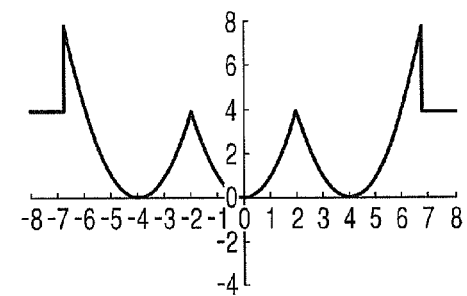
Figure 4B:
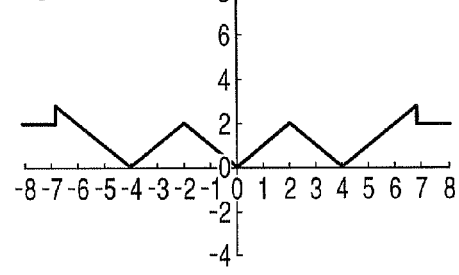
Figure 4D:
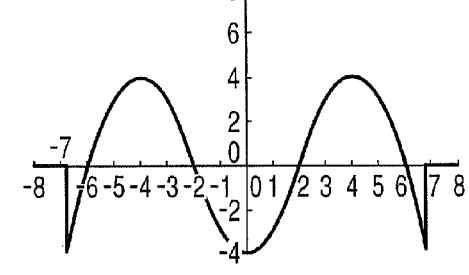

On the other hand, in order to obtain a curve expressing the soft decision value as to the LSB, a curve of y=ABS (ABS(−ABS(x)+2)−2) is first obtained as illustrated in FIG. 4(a). Then, the value of y as to the curve is fixed to 2 when y is L or more, thereby the curve of FIG. 4(b) is obtained. The value of y as to the curve of FIG. 4(b) is squared to obtain the curve of FIG. 4(c). As to the curve of FIG. 4(c), y is subtracted from 4 and taken as a new y when the absolute value of x is 2 or more, and 4 is subtracted from y and taken as a new y when the absolute value of x is 2 or less, thereby the curve of FIG. 4(d) is obtained. The curve of FIG. 4(d) is scaled so that the values of y become 0 to 7. This can approximate the curve expressing the soft decision value of the LSB to the curve in FIG. 11.

The soft decision decoding unit 5 sequentially performs calculation for the amplitude value sequentially sampled in the symbol acquirement unit 3 according to the procedure for obtaining the curve expressing the soft decision value of the MSB and the LSB bit, allowing sequentially outputting the soft decision values of 0 to 7 for each bit of each symbol. In both the procedures, the range of the scaling finally performed is changed to enable changing the fineness of the soft decision.

Figure 5:
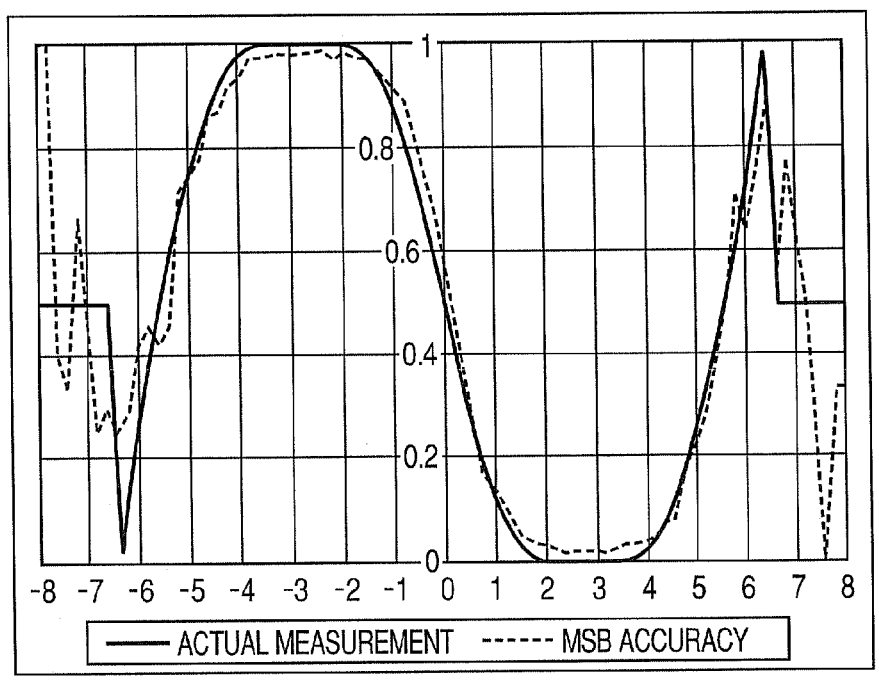
FIG. 5 is a graph illustrating a comparison between the approximate curve obtained by the procedure in FIG. 3 and the actual measurement value.
Figure 6:
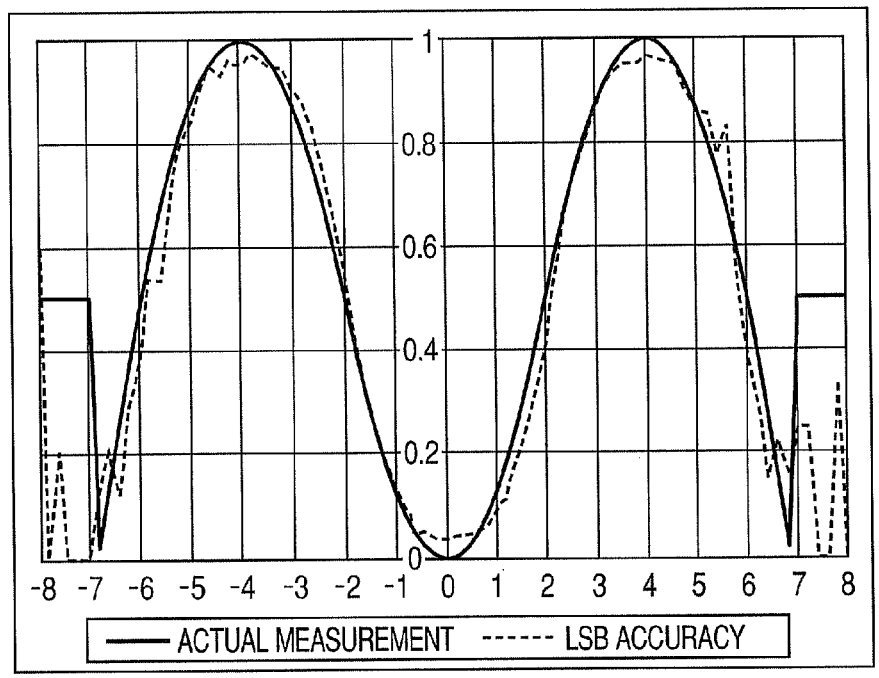
FIG. 6 is a graph illustrating a comparison between the approximate curve obtained by the procedure in FIG. 4 and the actual measurement value.
Figure 7:
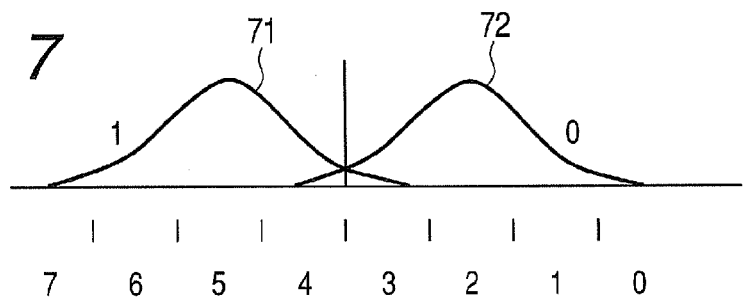
FIG. 7 is a graph illustrating a relationship between a probability distribution and a soft decision value as to a binary in the case of a binary code according to a conventional example.
Figure 8:
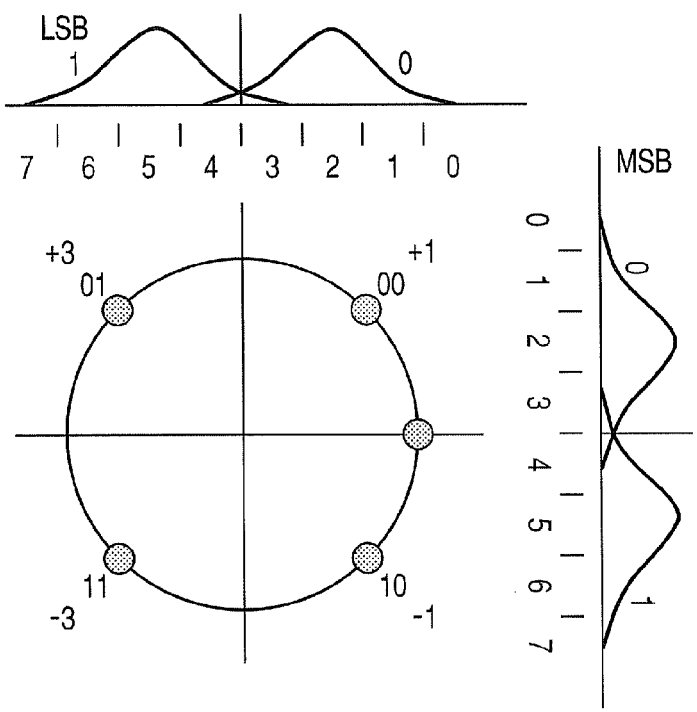
FIG. 8 is a graph illustrating an example of soft decision in the case of a four-level code according to a conventional example.
Figure 11:
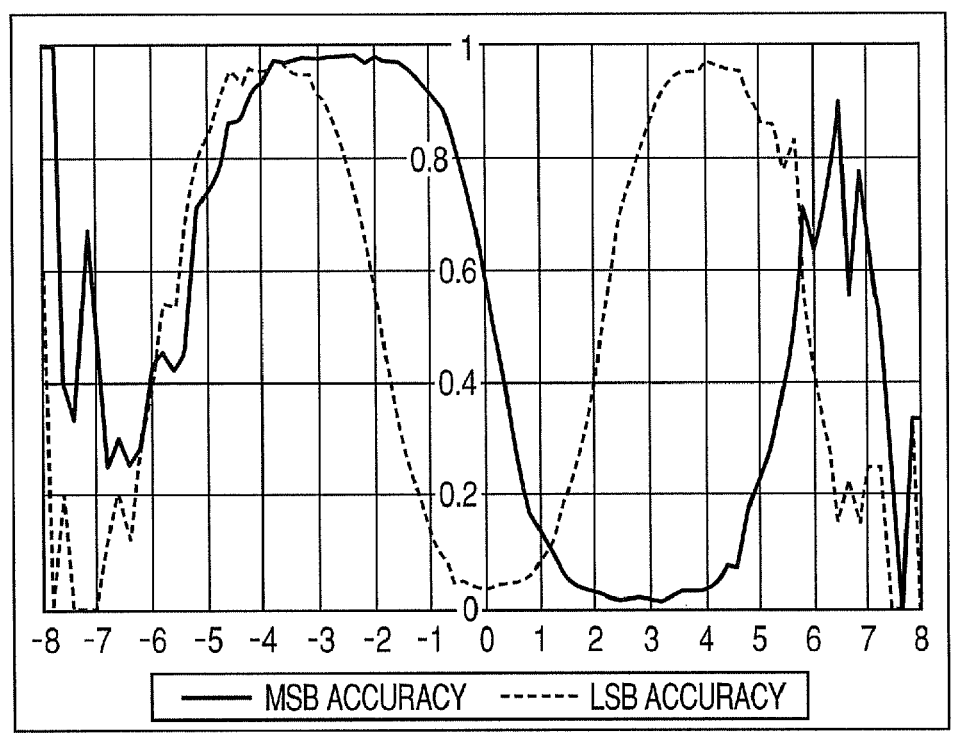
FIG. 11 is a graph illustrating the measured values of the probability that the demodulation bit of four-level FSK is 1 at a certain error rate with the abscissa as amplitude and the ordinate as probability.

FIG. 5 illustrates a comparison between the approximate curve as to the MSB bit obtained by the procedure in FIG. 3 and the actual measured value in FIG. 11. FIG. 6 illustrates a comparison between the approximate curve as to the LSB bit obtained by the procedure in FIG. 4 and the actual measured value in FIG. 11. From these figures, it can be seen that the curve of the actually measured probability can be reproduced by the approximate curve. The value "L" in the procedure in FIGS. 3 and 4 determines the upper limit of the amplitude value. Actually, a received demodulated wave is filtered, so that the amplitude value exceeding a certain value is not inputted. A large amplitude value does not fall within the curve of the probability, so that the probability as to the amplitude value exceeding the upper limit is taken as 50%.

According to the present embodiment, the soft decision value for each bit corresponding to the amplitude value can be obtained by a simple calculation processing which follows the procedure in which the curve expressing the soft decision value is formed by using a simple quadratic function. For example, the processing can be described by C language with a dozen lines. Since the variable n for adjusting the curve shape and the value L for determining the range of approximation are used in the procedure for forming the curve expressing the soft decision value, these values are changed to enable readily adjusting the curve shape and the approximate range. Properly selecting the range of scaling is readily adaptable to the soft decision value of 256 stages, for example.

In order that the curve expressing the accuracy of the MSB and the LSB bit is determined by actually calculating the probability, probability density functions at respective symbol points (−3, −1, +1, and +3) need solving and adding. The probability density function can be expressed by the following equation. [Expression 1]

Where, μ is average and σ² is dispersion. The average μ at the symbol point of −3 is taken as −3 and σ and σ² may be previously prepared. If the probability density function at the symbol point of −3 is taken as N(−3) and, similarly, the probability density functions at respective points are taken as N(−1), N(+1), and N(+3), the curve of the MSB bit can be determined by {N(+1)+N(+3)}/{N(−1)+N(−3)+N(+1)+N(+3)}. The curve of the LSB bit can be determined by {N(−1)+N(+1)}/{N(−1)+N(−3)+N(+1)+N(+3)}. If the MSB and the LSB accuracy are calculated according to the procedure, the existence of the exponential function (exp) in the equation of the probability density function increases a load to significantly slow the processing at the time of performing calculation by DSP or the like.

It is to be understood that the present invention is not limited to the above embodiment and various modifications may be made therein. Although in the abovementioned embodiment the soft decision value is outputted based on the amplitude waveform of the demodulated signal for the case of the four-level FSK, the present invention can also be applied to other modulation systems as well as to the four-level FSK as long as the modulation system is capable of allotting the probability density function following the Gauss distribution to each symbol point. For example, the present invention can also be applied to the QPSK.

The invention claimed is:

1. A soft decision device characterized by outputting a soft decision value for each bit of each symbol used for decoding each symbol in correspondence with the function value obtained by applying a predetermined function for each bit to the sample value of each symbol based on the demodulated signal in which the probability distribution of the sample value at each symbol point represents the Gauss distribution due to noise of a communication path,
wherein each predetermined function for each said bit is approximated to a curve expressing the probability that each bit is 1 or 0 with respect to the sample value of each symbol of the demodulated signal and formed by using a quadratic function,
wherein, if the predetermined function is taken as y=f(x), f(x) can be obtained by:
(1) squaring y of a curve which is expressed by a straight line the slope of which is 1 or −1 in the range of x of a portion formed by the quadratic function and in which y is a constant value in the range of x of other portions;
(2) parallel displacing the entire curve to the direction y by a predetermined value and then reversing the value y in the predetermined range of x; and
(3) performing scaling so that the value y of the reversed curve corresponds to the soft decision value.

2. The soft decision device according to claim 1, wherein, if each bit of the symbol is a first and a second bit in the case of a multi-value number of 2 on the assumption that the demodulated signal is based on a multi-value modulation system and if the symbol points are taken as −3*a/2, −a/2, a/2, 3*a/2 in a bipolar expression with "a" as a predetermined constant,
the first bit of the function for each said bit can be obtained by: performing the aforementioned process (1) by squaring ABS(n−ABS(x))+a−n being a function of "x" with a function value as "a" in a range of "x" where the function value is L or more and a function value as 0 in a range of "x" where the function value is 0 or less, where "x" is the amplitude of a demodulated wave, "n" and "L" are predetermined constants, and ABS is an absolute value;
performing the aforementioned process (2) by subtracting the square of "a" from the function obtained by the process in the range where "x" is 0 or more and subtracting the function from the square of "a" in the range where "x" is 0 or less; and
performing the aforementioned process (3); on the other hand,
the second bit of the function can be obtained by: performing the aforementioned process (1) by squaring ABS (ABS(−ABS(x))+a)−a) being a function of "x" with a function value as "a" in a range of "x" where the function value is L or more;
performing the aforementioned process (2) by subtracting the function obtained by the process from the square of "a" in the range where the absolute value of "x" is "a" or more and subtracting the square of "a" from the function in the range where the absolute value of "x" is "a" or less; and
performing the aforementioned process (3).

3. The soft decision device according to any one of claims 1 and 2, wherein, if the predetermined function is taken as f(x), the value of f(x) in the predetermined range at both ends of the range where "x" varies is a half of the range where f(x) varies.

4. A soft decision method characterized by performing a process to output a soft decision value for each bit of each symbol used for decoding each symbol in correspondence with the function value obtained by applying a predetermined function for each bit to the sample value of each symbol based on the demodulated signal in which the probability distribution of the sample value at each symbol point represents the Gauss distribution due to noise of a communication path,
wherein each predetermined function for each said bit is approximated to a curve expressing the probability that each bit is 1 or 0 with respect to the sample value of each symbol of the demodulated signal and formed by using a quadratic function,
wherein, if the predetermined function is taken as y=f(x), f(x) can be obtained by:
(1) squaring y of a curve which is expressed by a straight line the slope of which is 1 or −1 in the range of x of a portion formed by the quadratic function and in which y is a constant value in the range of x of other portions;
(2) parallel displacing the entire curve to the direction y by a predetermined value and then reversing the value y in the predetermined range of x; and
(3) performing scaling so that the value y of the reversed curve corresponds to the soft decision value.

* * * * *